United States Patent [19]

Hardee

[11] Patent Number: 4,776,586
[45] Date of Patent: Oct. 11, 1988

[54] STRESS RELIEVING AND SAFETY DEVICE

[76] Inventor: Kelly D. Hardee, 128 Roland Dr., Hampton, Va. 23669

[21] Appl. No.: 75,640

[22] Filed: Jul. 20, 1987

[51] Int. Cl.⁴ .................... A63B 71/06; A63B 23/04
[52] U.S. Cl. ................................ 272/96; 272/136; 446/7
[58] Field of Search ............... 272/96, 141, 135, 136, 272/DIG. 5; 446/7; 200/86.5, 61.89; 424/62, 66

[56] References Cited

U.S. PATENT DOCUMENTS

| | | | |
|---|---|---|---|
| 1,911,390 | 5/1933 | Pullman | 272/96 |
| 2,814,156 | 11/1957 | Cislak | 446/7 |
| 2,830,816 | 5/1958 | Uhl . | |
| 2,838,628 | 6/1958 | Ryall | 200/61.89 |
| 3,155,789 | 11/1964 | Hull | 200/86.5 |
| 3,231,987 | 2/1966 | Schott et al. | 434/59 |
| 3,295,847 | 1/1967 | Matt, Sr. . | |
| 3,404,246 | 10/1968 | Stimpson | 200/86.5 |
| 3,541,703 | 11/1970 | Mottola | 434/66 |
| 3,594,920 | 7/1971 | Kordewick | 434/66 |
| 3,741,540 | 6/1973 | Shimizu . | |
| 3,948,514 | 4/1976 | Von Holt | 272/104 X |
| 4,111,416 | 9/1978 | Jinotti . | |
| 4,172,217 | 10/1979 | Miller | 200/86.5 |
| 4,735,195 | 4/1988 | Blum et al. | 272/DIG. 5 |

FOREIGN PATENT DOCUMENTS 3042522 6/1982 Fed. Rep. of Germany ... 272/DIG. 5

Primary Examiner—Richard J. Apley
Assistant Examiner—Franklin L. Gubernick
Attorney, Agent, or Firm—Wallace J. Nelson

[57] ABSTRACT

A non-functioning or pseudo-brake designed for use by passengers in a moving vehicle to depress when they desire the vehicle driver to brake or slow down. A portable brake pedal 14 (FIGS. 1-4) is positioned on the vehicle floor in front of a passenger, and when the passenger presses pedal 14, a warning light 30 and/or buzzer is actuated by switch 26 to let the driver know that his passenger(s) are concerned about his driving. A pivotal support arm 16 and a coil spring 20 support pedal 14 spaced from a heavy metal plate 12. Plate 12 is augmented by granular filled bags 42, 43 to maintain the device positioned on the vehicle floorboard. A battery 24 supplies power to actuate light 30 and/or the buzzer. Light housing 30 is releasably attached to the vehicle dashboard via a magnet 31, suction cup, double-backed adhesive tape, or the like.

In a modified form of the invention warning light 50 is factory installed and provided with an outlet 51 for connection with pin 52 leading to the pedal assembly. Outlet 51 may be omitted and instrument 50 connected to a factory installed pedal (not shown) in a comfortable out-of-the-way location comparable to dimmer switches now employed on some vehicles on the driver's side. When not in use, and to facilitate shipping or storage, a hook 46 and pin 48 (FIG. 2) are employed to maintain coil spring 20 in the compressed position.

9 Claims, 1 Drawing Sheet

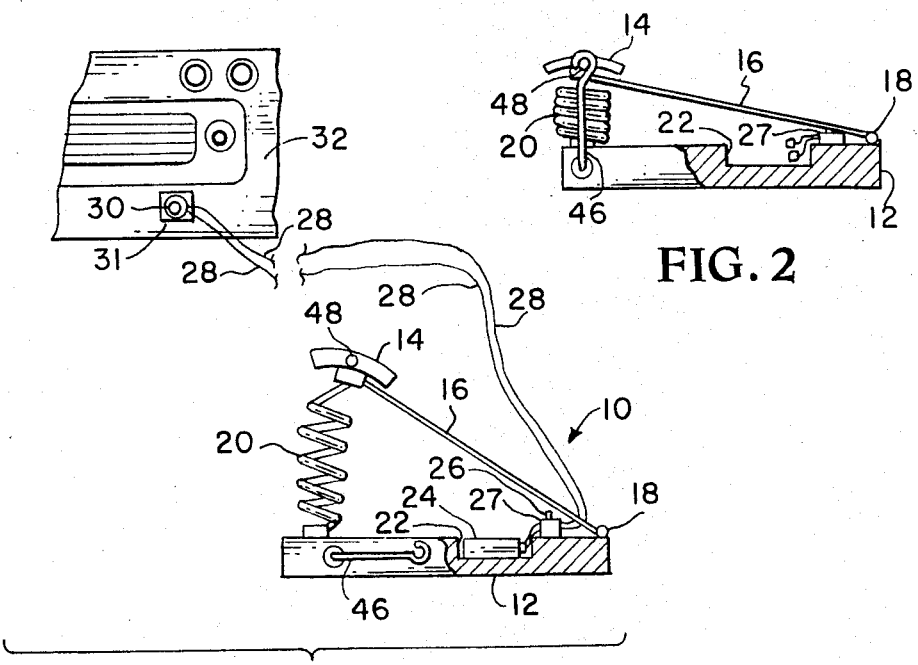
FIG. 1
FIG. 2
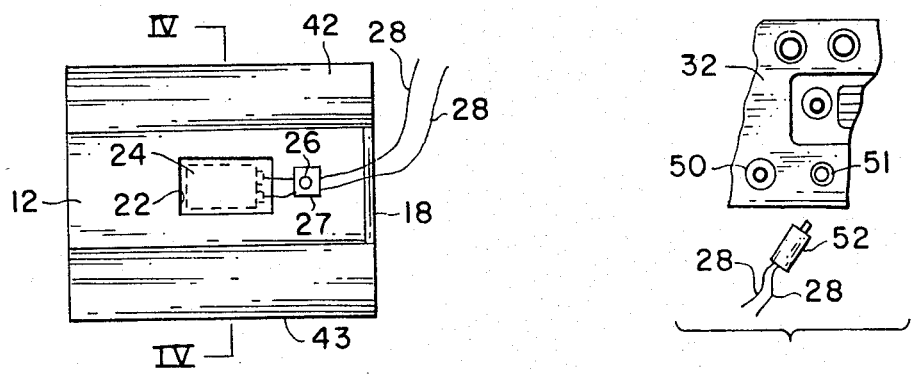
FIG. 3
FIG. 5
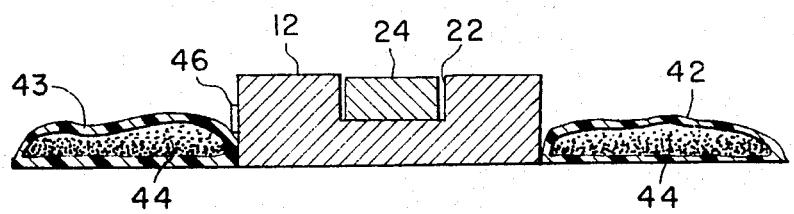
FIG. 4

STRESS RELIEVING AND SAFETY DEVICE

BACKGROUND OF THE INVENTION

This invention relates to a pseudo-brake for use by apprehensive passengers in a moving vehicle as a stress relief or signal device to the driver.

Many individuals are apprehensive when riding in a vehicle as a passenger rather than as the operator. It is a normal feeling of most individuals to have the urge at various times to apply the brake or steer the vehicle for the operator while occupying the role of a passenger. To some it becomes an obsession and to many, being unable to have an active part in the vehicle operation, creates stress and considerable tension on the individual. Also, there are times when a passenger would like to ask the driver of the vehicle to slow down or to be more careful in his operation of the vehicle without appearing to be too much of a "back seat driver". Some drivers do not take kindly to verbal suggestions or other comments made by passengers regarding the operation of the vehicle and react adversely to their unsolicited assistance. Also, in the training of new drivers there are times when the instructor would like to advise the student to slow down or be more careful without inducing panic. Further, a number of vehicle operators are hearing impaired and this limits communication between the operator and his passenger(s).

It is thus seen that there exists a definite need in the art for a device or apparatus that can serve as a stress relieving system for apprehensive vehicle passengers, a non-verbal communication device between the passenger and the driver, a safety warning device for student and other vehicle drivers, and a communication alert for the hearing impaired vehicle operator.

It is therefore an object of the present invention to provide a stress relieving device operable by vehicle passengers to release tension and give some feeling of vehicle control to the vehicle passenger.

It is a further object of the present invention to provide a signal device operable by a vehicle passenger to alert the vehicle driver that the passenger is concerned about the operation of the vehicle.

Another object of the present invention is an apparatus controlled by a vehicle passenger that gives him some feeling of control of the vehicle operation.

Another object of the present invention is a device that permits the vehicle passenger to signal the vehicle operator without speaking.

Another object of the present invention is a portable, safety, teaching aide and stress relieving system that may be attached to a vehicle when desired, and removed therefrom, with little effort.

A further object of the present is a factory installed safety, teaching aide and stress relieving system that is operable by a vehicle passenger.

SUMMARY OF THE INVENTION

The foregoing and additional objects are attainable according to the present invention by providing a non-functioning, or pseudo-brake designed for use by passengers in a moving vehicle to depress when they desire or wish that the vehicle driver would brake or slow down. In one aspect of the present invention a portable brake pedal is positioned on the vehicle floor in front of a passenger, either front or back, and when the passenger presses on the pedal, a suitable warning light and/or buzzer is activated to let the driver know that his passenger(s) are either concerned about his driving, or if they were the driver, they would be braking. A pivotal support arm and a coil spring support the brake pedal spaced from a heavy base plate positioned on the vehicle floorboard. A suitable battery operated light and/or buzzer is actuated when the brake pedal is depressed a predetermined distance to overcome the resistance of the coil spring. This warning device is connected to the base plate by suitable connecting wires and may be temporarily attached to the vehicle dashboard by a suction cup, magnet, double-backed adhesive tape, or the like. In another aspect of the present invention the warning light and pseudo-brake are factory installed and the brake pedal may be stored out of the way when not used.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying drawings wherein:

FIG. 1 is a view of the portable pseudo-brake system of the present invention in operable position in a vehicle with parts shown in section and parts omitted for clarity;

FIG. 2 is a view similar to FIG. 1. illustrating the locking mechanism employed when storing and/or shipping the present invention;

FIG. 3 is a top view of the pseudo brake pedal support shown in FIG. 1 with parts omitted for clarity;

FIG. 4 is a sectional view taken along line IV—IV of FIG. 3; and,

FIG. 5 is a partial view illustrating a modified form of the invention shown in FIG. 1.

DETAILED DESCRIPTION

Referring now to the drawings, FIG. 1 shows the pseudo-brake system of the present invention and is designated generally by the reference numeral 10. As shown therein, pseudo-brake system 10 includes an aluminum, stainless steel, or other heavy metal base plate 12 supporting a brake pedal member 14. An elongated stabilizing arm 16 is attached at one end to, and serves as partial support for, pedal 14. The other end of stabilizing arm 14 is pivotally connected to base plate 12 via pivot pin 18. A coil spring 20 is also attached at one end to pedal 14 and vertically extends from pedal 14 to base plate 12 with the other end of coil spring 20 being attached to base plate 12. A suitable depression or channel 22 is formed in base plate 12 and serves to receive a battery 24. Battery 24 is in electric connection with a switch 26. Lead wires 28 extend from switch 26 to connect with a housing 30 removably attached via attachment mechanism 31 to dashboard 32 of a vehicle in view of the vehicle driver. Attachment mechanism 31 in the preferred embodiment is a permanent magent attached to the back housing 30 and adapted to releasably attach to dashboard 32. Other suitable attachment mechanisms include double-backed adhesive rubber tape, a strip of Velcro ® and a suction cup. A suitable light bulb is carried by housing 30 and is actuated when the vehicle passenger depresses pedal 14 sufficiently to close switch 26. The light employed may be a flashing or continuous light source and is preferably red, although any other colored or clear light source may be employed.

Although heavy metal plate 12 provides sufficient weight to the pedal assembly to normally restrict movement on the vehicle floorboard, additional stabilizing support is provided by attaching a pair of weighted pliable bags or supports 42, 43 to the sides of base plate 12. Bags 42, 43 are filled with granules 44 of sand, lead, or the like to supply the additional weight needed.

For packaging the pedal assembly (FIG. 2), battery 24 is omitted from the channel 22 and pedal 14 forcibly depressed toward base plate 12 to overcome the strength of coil spring 20. While in this depressed position, rotatable hook member 46 carried by base plate 12 is engaged over retainer pin 48 extending from pedal 14 and the force of coil spring 20 retains the assembly in this more compact state. Pliable bags 42, 43 are folded along the side and bottom of plate 12 and wires 28 wrapped therearound. When ready for use, wires 28 and the attached light housing 30 are unwound, pliable bags 42, 43 positioned in place (FIG. 4), hook 46 is unlatched from pin 48 and coil spring 20 positions pedal 14 as shown in FIG. 1. Battery 24 is then connected to switch 26, light housing 30 attached to the vehicle dashboard via attachment mechanism 31, the pedal assembly placed on the vehicle floorboard in front of a passenger and the system is operational.

For factory installed units, an instrument on the vehicle instrument panel, such as for example, instrument 50 (FIG. 5) is equipped with a suitable light indicator and wired into the vehicle electric system. The leads from instrument 50 extend to an outlet 51 disposed on or beneath the vehicle dashboard. In this embodiment a terminal connection 52 is provided on wires 28 and adapted to be received by outlet 51. Wires 28 lead to switch 26 on the same type movable pedal assembly, as described hereinbefore, with the exception that no separate battery would be employed. In this factory installed unit, the pedal assembly is stored in a side pocket adjacent the passenger side of the front seat or under the dash until desired for use. The switch and other components of the factory installed unit operate in the same manner as described hereinabove for the portable unit. Also, in the factory installed systems, outlet 51 may be eliminated and instrument 50 wired directly to a permanently installed pedal positioned on the vehicle over the wheel well portion of the vehicle floor. This pedal location is on the opposite vehicle side but comparable to dimmer switches employed now on some vehicles. That is, the pedal is out of the way, but readily accessible to the user.

Thus, when any passenger of a vehicle equipped with the present invention feels a need for stress relief the device may be actuated and used. Also, when a driver training instructor wants to warn a student driver to brake or be cautious, the present invention serves that need. Even when a spouse does not want to speak to their mate operating a vehicle, the present invention may be employed to communicate his or her concern or dissatisfaction about the vehicle operation.

For the hearing impaired driver, a passenger may utilize the present invention to signal the vehicle operator. In this latter situation, a prearranged signal system could be established to indicate that a rest stop was needed or the like. Also, suitable instruments could be employed with the present invention to transmit different messages.

In each of the embodiments described above, an electrically actuated buzzer or other sound producing signal device may be incorporated in the switch housing 27 to act simultaneously with or in lieu of the light signal. Also, when the stress relieving function is desired alone, and/or if the driver does not want to be exposed to the warning light or sound alert feature, these mechanisms may be disconnected and the pedal assembly still function to give the passenger some feeling of vehicle control.

Although only one hook member 46 has been described, it is to be understood that another hook and pin may be employed on the opposite side of base plate 12, if needed. Also, the position of the hook and pin retention is not confined to the side of base plate 12 and pedal 14, but may be placed on the ends thereof, if so desired.

The invention has been described relative to specific embodiments merely to demonstrate the operation thereof and it is to be understood that the inventon is not so limited. There are numerous variations and modifications of the invention that will be readily apparent to those skilled in the art in the light of the above teachings. It is therefore to be understood that, within the scope of the appended claims, the invention may be practiced otherwise than as specifically described.

What is claimed as new and desired to be secured by Letters Patent of the United States is:

1. A pseudo-brake for use by a passenger in a moving vehicle to relieve tension on the passenger and indicate to the vehicle operator that the passenger is concerned about the operation of the vehicle, comprising:

a heavy metal base plate positionable on the floor of a vehicle in front of a vehicle passenger;
   a pliable bag containing granular weight material secured to each of two sides of, and extending the length of, said heavy metal plate to assist in maintaining the pseudo-brake in position on the floor of a vehicle;
   a pedal member supported by said base plate and adapted to be depressed by a vehicle passenger;
   an elongated stabilizing arm having one end pivotally connected to said base plate and the other end thereof attached to said pedal;
   spring means interposed between said base plate and said pedal and normally biasing said pedal away from said base plate to simulate the resistance of, and give the feel of, an actual brake system when said pedal member is depressed;
   switch means disposed on said base plate and operable by the vehicle passenger when depressing said pedal;
   an electric circuit closed by said switch means;
   an indicator means connected to and operable by said electric circuit to alert the vehicle operator that the passenger is depressing said pedal;
   a battery supply for said electric circuit; and
   said battery supply being supported by and secured to said base plate.

2. The pseudo-brake of claim 1 wherein said indicator means is disposed on the vehicle dash board and selected from the group of indicator means consisting of an electric light and an electrically actuated sound producing mechanism.

3. A pseudo-brake assembly for use by a moving vehicle passenger to relieve stress and tension on the passenger while also serving to alert the vehicle operator that the passenger is concerned about the operation of the vehicle, comprising:

a heavy metal base plate having a pair of granular weight material containing bags attached thereto;

an elongated stabilizing arm pivotally connected to said base plate at one end thereof and having a pedal member integrally attached to the other end thereof;

said pedal member being positioned in front of a vehicle passenger and adapted to simulate a real brake pedal and to be depressed by the foot of the passenger;

spring biasing means normally maintaining said pedal member spaced from said base plate;

said spring biasing means being a coil spring interposed between said base plate and said pedal member and serving to simulate the feel and resistance of an actual brake pedal when the pedal member is depressed by the vehicle passenger, and indicator means serving to alert the vehicle driver of the passenger's action and concern.

4. The pseudo-brake of claim 3 wherein said indicator means is an original equipment electric light indicator incorporated within the vehicle dashboard instrument panel.

5. The pseudo-brake of claim 4 including an electric outlet on the vehicle dash board, switch means carried by said base plate and actuable by pressing said pedal member, lead wires extending from said switch means, an electric plug connected to said lead wires and received by said electric outlet on the vehicle dash board for electrically connecting said original equipment indicator to said switch means.

6. The pseudo-brake assembly of claim 3 wherein said indicator means is an indicator instrument on the vehicle instrument panel and in electrical connection with an electric circuit, switch means actuable by depressing of said pedal by the vehicle passenger to close the electric circuit leading to said instrument.

7. The pseudo-brake assembly of claim 3 wherein said indicator means is an electric light and means for releasably securing said electric light to the vehicle dash board.

8. A method of relieving the anxiety and tension of a vehicle passenger while riding with a vehicle operator comprising the steps of:
(a) positioning a portable pseudo-brake pedal assembly on the vehicle floor board in position to be foot-depressed by the vehicle passenger;
(b) providing an electrical energy source in the form of a bettery carried by and actuable by the pseudo-brake pedal assembly;
(c) releasably connecting an indicator mechanism to the electric energy source and operable by depressing the pedal to inform the passenger and operator that the pedal has been depressed; and
(d) spring biasing the pedal away from the vehicle floor board whereby the passenger must overcome the spring force to depress the pedal and thereby simulate the pressure feeling of depressing an actual brake pedal.

9. The method of claim 8 wherein the indicator mechanism is a portable, releasably attached, indicator light disposed on the vehicle dash board.

* * * * *